United States Patent
Pyun et al.

(10) Patent No.: US 12,472,983 B2
(45) Date of Patent: Nov. 18, 2025

(54) AUTONOMOUS VEHICLE CONTROL APPARATUS AND METHOD THEREOF

(71) Applicants: Hyundai Motor Company, Seoul (KR); Kia Corporation, Seoul (KR)

(72) Inventors: Rosali Sun Pyun, Seongnam-si (KR); Woo Jin Kim, Incheon (KR); Seo Hyung Cheon, Seongnam-si (KR); Ki Seok Seong, Cheonan-si (KR); Eun Young Choi, Seoul (KR); Min Sang Yu, Hwaseong-si (KR)

( * ) Notice: Subject to any disclaimer, the term of this patent is extended or adjusted under 35 U.S.C. 154(b) by 247 days.

(21) Appl. No.: 17/994,749

(22) Filed: Nov. 28, 2022

(65) Prior Publication Data

US 2023/0278584 A1    Sep. 7, 2023

(30) Foreign Application Priority Data

Mar. 7, 2022   (KR) .......................... 10-2022-0028944

(51) Int. Cl.
*B60W 60/00*  (2020.01)
*B60W 40/04*  (2006.01)
*B60W 50/10*  (2012.01)
*B60W 50/14*  (2020.01)

(52) U.S. Cl.
CPC ........ *B60W 60/0015* (2020.02); *B60W 40/04* (2013.01); *B60W 50/10* (2013.01); *B60W 50/14* (2013.01); *B60W 2554/4046* (2020.02)

(58) Field of Classification Search
CPC ............. B60W 60/0015; B60W 40/04; B60W 50/10; B60W 50/14; B60W 2554/4046; G05D 1/0061; G05D 1/0088; G05D 1/021; G05D 1/0214; G05D 1/0221; G05D 1/0223
USPC .......................................... 701/23, 77, 301
See application file for complete search history.

(56) References Cited

U.S. PATENT DOCUMENTS

| | | | |
|---|---|---|---|
| 9,925,987 B1 * | 3/2018 | Nguyen | G08G 1/0129 |
| 10,713,948 B1 * | 7/2020 | Kim | G06V 40/20 |
| 11,654,904 B1 * | 5/2023 | Krishna | H04W 4/40 |
| | | | 340/435 |
| 2009/0037052 A1 * | 2/2009 | Ogasawara | G08G 1/167 |
| | | | 701/41 |
| 2016/0035220 A1 * | 2/2016 | Paromtchik | B60W 50/14 |
| | | | 701/117 |
| 2016/0103218 A1 * | 4/2016 | Mandava | B60Q 5/006 |
| | | | 701/301 |
| 2016/0355182 A1 * | 12/2016 | Remillard | G01C 21/3697 |
| 2017/0162049 A1 * | 6/2017 | Lee | G08G 1/0112 |
| 2017/0162050 A1 * | 6/2017 | Chen | G05D 1/0055 |
| 2017/0166123 A1 * | 6/2017 | Bahgat | B60W 30/0953 |
| 2017/0210378 A1 * | 7/2017 | Gunaratne | B60W 10/18 |
| 2017/0241791 A1 * | 8/2017 | Madigan | G06Q 40/08 |
| 2018/0144636 A1 * | 5/2018 | Becker | B60W 30/0956 |
| 2018/0182245 A1 * | 6/2018 | Takabayashi | G08G 1/167 |

(Continued)

*Primary Examiner* — Manglesh M Patel
(74) *Attorney, Agent, or Firm* — Banner & Witcoff, Ltd.

(57) ABSTRACT

An autonomous vehicle control apparatus may control autonomous driving of a driving vehicle based on monitoring a plurality of surrounding vehicles. The autonomous vehicle control apparatus may monitor a plurality of surrounding vehicles located around the driving vehicle, and select a vehicle of interest as a target vehicle. The autonomous vehicle control apparatus may control the driving vehicle to avoid the target vehicle that exhibits an abnormal driving pattern.

18 Claims, 6 Drawing Sheets

(56) References Cited

U.S. PATENT DOCUMENTS

| | | | |
|---|---|---|---|
| 2018/0237012 A1* | 8/2018 | Jammoussi | B60W 50/082 |
| 2019/0051179 A1* | 2/2019 | Alvarez | H04W 4/46 |
| 2019/0080593 A1* | 3/2019 | Mizuta | G08G 1/0116 |
| 2019/0088135 A1* | 3/2019 | Do | B60W 50/14 |
| 2019/0278277 A1* | 9/2019 | Tao | B60W 60/0011 |
| 2020/0008028 A1* | 1/2020 | Yang | G08G 1/0175 |
| 2020/0255029 A1* | 8/2020 | Matsunaga | G05D 1/0231 |
| 2021/0237758 A1* | 8/2021 | Wang | B60W 40/10 |
| 2022/0126863 A1* | 4/2022 | Moustafa | G06T 9/00 |
| 2022/0297699 A1* | 9/2022 | Kim | H04W 4/06 |
| 2023/0052137 A1* | 2/2023 | Choi | B60W 40/04 |
| 2023/0162597 A1* | 5/2023 | Tummala | B60W 30/00 701/117 |
| 2023/0278585 A1* | 9/2023 | Hammoud | B60W 60/0015 701/26 |
| 2023/0311949 A1* | 10/2023 | Tariq | B60W 60/00274 701/23 |
| 2023/0408271 A1* | 12/2023 | Rusciano | G08G 1/0141 |
| 2024/0166244 A1* | 5/2024 | Ucar | G06V 10/80 |
| 2024/0182063 A1* | 6/2024 | Esna Ashari Esfahani | B60W 30/0956 |
| 2024/0296428 A1* | 9/2024 | Horihata | G06Q 10/20 |
| 2025/0225865 A1* | 7/2025 | Yang | G08G 1/0967 |
| 2025/0225874 A1* | 7/2025 | Yang | G08G 1/162 |

* cited by examiner

AUTONOMOUS VEHICLE CONTROL APPARATUS AND METHOD THEREOF

CROSS-REFERENCE TO RELATED APPLICATION

This application claims the benefit of priority to Korean Patent Application No. 10-2022-0028944, filed in the Korean Intellectual Property Office on Mar. 7, 2022, the entire contents of which are incorporated herein by reference.

TECHNICAL FIELD

The present disclosure relates to an autonomous vehicle control apparatus and a method thereof, and more particularly, relates to an autonomous vehicle control apparatus for selecting a target vehicle among surrounding vehicles and avoiding the target vehicle and a method thereof.

BACKGROUND

A vehicle travelling on the road may be loaded with various devices for protecting passengers, assisting in operation, or improving ride quality.

In recent years, active research has been conducted in the field of autonomous driving that enables a vehicle to drive itself while a portion or all of the intervention from a driver is excluded from vehicle driving. An autonomous vehicle may recognize surrounding environments via one or more sensors gathering external information and a processing function while driving to autonomously determine a driving route and may independently travel using its own power.

For such an autonomous vehicle to travel to a destination along an optimized route, the vehicle may need to be capable of identifying and responding to a surrounding vehicle that may potentially threaten the safety of the autonomous vehicle and its occupants.

SUMMARY

The present disclosure has been made to solve the above-mentioned problems occurring in the prior art while advantages achieved by the prior art are maintained intact.

An aspect of the present disclosure provides an autonomous vehicle control apparatus for selecting a target vehicle among surrounding vehicles and avoiding the target vehicle and a method thereof.

Another aspect of the present disclosure provides an autonomous vehicle control apparatus for avoiding a target vehicle selected among surrounding vehicles to prevent an accident and a method thereof.

The technical problems to be solved by the present disclosure are not limited to the aforementioned problems, and any other technical problems not mentioned herein will be clearly understood from the following description by those skilled in the art to which the present disclosure pertains.

An autonomous vehicle control apparatus may include one or more processors configured to control autonomous driving of a driving vehicle; and memory storing instructions, when executed by the one or more processors, cause the one or more processors to monitor one or more surrounding vehicles located around the driving vehicle; select a target vehicle among the one or more surrounding vehicles; control the driving vehicle to avoid the target vehicle while maintaining a first driving route of the driving vehicle; and control the driving vehicle to switch to a second driving route different from the first driving route, based on the target vehicle exhibiting an abnormal driving pattern.

The instructions, when executed by the one or more processors, may cause the one or more processors to select the target vehicle by: comparing a monitored driving pattern of the target vehicle with the abnormal driving pattern; and selecting, based on the comparison, the target vehicle among the one or more surrounding vehicles.

The abnormal driving pattern may include a unique driving pattern and/or a threatening driving pattern.

The unique driving pattern may include a condition for at least one of: whether the target vehicle and the driving vehicle are driving in a same driving lane, a number of times the target vehicle drifts out of a driving lane, an amount of time driven by the target vehicle while drifting out of the driving lane, and/or a speed of the target vehicle, wherein the speed is less than a road speed limit.

The threatening driving pattern may include a condition for at least one of: a distance between the target vehicle and the driving vehicle, a number of sudden stops made by the target vehicle in front of the driving vehicle, a number of lane changes made by the target vehicle, a speed of the target vehicle, wherein the speed is greater than a road speed limit, and/or a number of instances of rapid acceleration or rapid deceleration.

The instructions, when executed by the one or more processors, may cause the one or more processors to select the target vehicle among the one or more surrounding vehicles based on a volume of traffic on the first driving route.

The instructions, when executed by the one or more processors, may cause the one or more processors to select the target vehicle based on a condition for at least one of: a number of times the target vehicle drifts out of a driving lane, an amount of time driven by the target vehicle while drifting out of the driving lane, a number of sudden stops made by the target vehicle in front of the driving vehicle, a number of lane changes made by the target vehicle, a speed of the target vehicle, wherein the speed is greater than a road speed limit, a number of instances of rapid acceleration or rapid deceleration, and/or whether a traffic condition of the first driving route is a congestion.

The instructions, when executed by the one or more processors, may cause the one or more processors to control the driving vehicle to avoid the target vehicle by controlling the driving vehicle to change a driving lane in the first driving route, in response to the abnormal driving pattern of the target vehicle affecting the driving vehicle.

The instructions, when executed by the one or more processors, may cause the one or more processors to control the driving vehicle to avoid the target vehicle by controlling the driving vehicle to accelerate or decelerate in the first driving route, based on a determination that it is difficult to change a driving lane of the driving vehicle.

The instructions, when executed by the one or more processors, may further cause the one or more processors to set a destination of the driving vehicle to a safe location, based on the abnormal driving pattern of the target vehicle continuing after the driving vehicle switches to the second driving route.

The instructions, when executed by the one or more processors, may cause the one or more processors to: store, in a database of a server, at least one of identification information of the target vehicle or driving information of the target vehicle.

The instructions, when executed by the one or more processors, may cause the one or more processors to select the target vehicle by: receiving, via a user interface of the driving vehicle, a user input selecting the target vehicle.

A graphic representation of the target vehicle may be displayed on the user interface.

The instructions, when executed by the one or more processors, may further cause the one or more processors to send, to a server and after the driving vehicle switches to the second driving route, at least one of: identification information of the target vehicle, identification information of the driving vehicle, and/or the second driving route.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
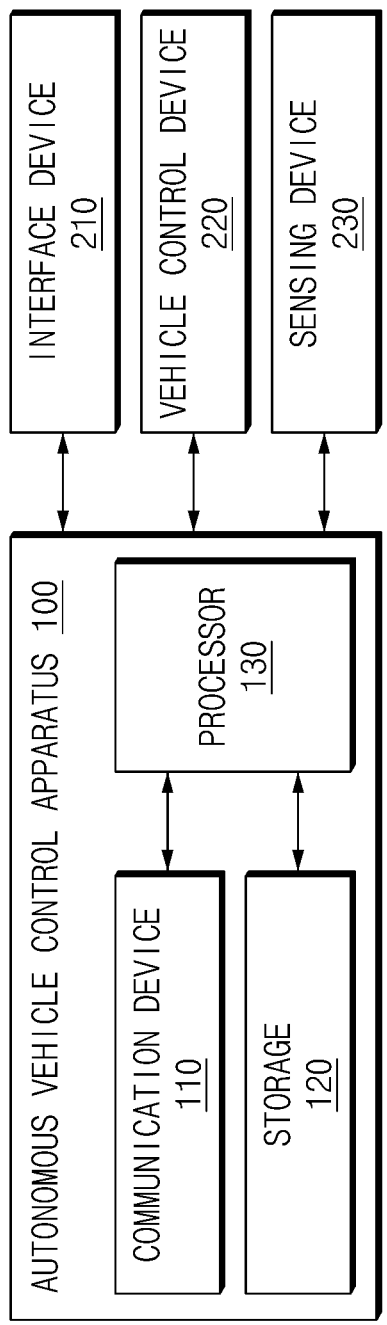
FIG. 1 is a block diagram illustrating a configuration of an example vehicle system including an autonomous vehicle control apparatus.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiments according to the present disclosure, terms such as first, second, "A", "B", (a), (b), and the like may be used. These terms have only been used to distinguish one element from another element, but do not limit the corresponding elements by implying the order or priority of the corresponding elements. Furthermore, unless otherwise defined, all terms including technical and scientific terms used herein are to be interpreted as is customary in the art to which this disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 6.

FIG. 1 is a block diagram illustrating a configuration of a sample vehicle system including an autonomous vehicle control apparatus.

Referring to FIG. 1, the vehicle system including an autonomous vehicle control apparatus 100 may include an interface device (e.g., user interface) 210, a vehicle control device 220, and a sensing device (e.g., a sensor) 230.

The sensing device 230 may sense an external object (e.g., a vehicle, a pedestrian, a bicycle, a motorcycle, debris, a roadblock, etc.) located around a vehicle (e.g., a driving vehicle) whose autonomous driving feature has been activated.

The sensing device 230 may obtain information regarding at least one of a position of the external object, a distance to the external object, a speed of the external object, a movement direction of the external object, a type of the external object, or any combination thereof.

To this end, the sensing device 230 may include at least one of various sensors such as an ultrasonic sensor, a radar, a light detection and ranging (LiDAR) sensor, a camera, a laser scanner, a corner radar, an acceleration sensor, a yaw rate sensor, a torque sensor, a wheel speed sensor, and/or a steering angle sensor.

For example, the sensing device 230 may obtain an image around the driving vehicle via the camera. The sensing device 230 may detect an external object located around the driving vehicle via the radar and/or LiDAR sensor.

As an example, the sensing device 230 may obtain an image around the driving vehicle and may analyze the obtained image. The driving vehicle may perform autonomous driving based on the analyzed image.

The interface device 210 may include an input interface (e.g., input device) for receiving a control command from a user of the driving vehicle (e.g., a vehicle occupant (e.g., a driver or a passenger)) or a vehicle-related person (e.g., an owner). The interface device 210 may include an output interface (e.g., input device for outputting an operation state, an operation result, and the like of the autonomous vehicle control apparatus 100.

The input interface may include at least one of a button (e.g., a key), a mouse (e.g., a scroll wheel), a joystick, a jog shuttle, and/or a stylus pen. Furthermore, the input interface may include a soft key (e.g., non-physical button) implemented on a display or may include a voice recognition interface (e.g., voice recognition device).

The output interface may include a display and may include a voice output interface (e.g., voice output device) such as a speaker. In this case, when a touch sensor is provided in the display, the display may operate as a touch screen and may be implemented in the form where the input interface and the output interface are integrated with each other.

As an example, the output interface may output an indication of at least one of a switch between an autonomous driving mode and a manual driving mode, an autonomous driving activation status, an autonomous driving deactivation status, unavailability of autonomous driving, availability of autonomous driving, a selection of a target vehicle, or any combination thereof.

As an example, the output interface may be implemented as a cluster (e.g., an instrument cluster), a heads-up display (HUD), an audio, video, and navigation (AVN) system, a display, a warning sound speaker, and/or a haptic device.

Driving situation information of the driving vehicle may be displayed on at least a portion of the display. The driving situation information may include at least one of information about an external object located outside of the driving vehicle, navigation information, vehicle state information, or any combination thereof.

The information about the external object may include at least one of information about whether there is an external object, information about a position of the external object, information about a distance between the driving vehicle and the external object, information about a relative speed between the driving vehicle and the external object, or any combination thereof.

The navigation information may include at least one of map information, set destination information, information about a route according to a destination setting, information about various external objects on the route, driving lane information, information about a current position of the driving vehicle, or any combination thereof.

The vehicle state information may include at least one of posture information of the vehicle, speed information of the vehicle, slope information of the vehicle, weight information of the vehicle, direction information of the vehicle, battery information of the vehicle, fuel information of the vehicle, tire pressure information of the vehicle, steering information of the vehicle, interior temperature information of the vehicle, interior humidity information of the vehicle, pedal position information, engine temperature information of the vehicle, or any combination thereof.

The vehicle control device 220 may control at least one of acceleration, deceleration, braking, and/or steering of the driving vehicle. The vehicle control device 220 may control at least one of a driving direction or a driving speed of the driving vehicle under control of the autonomous vehicle control apparatus 100 to facilitate stable driving of the driving vehicle. For example, the vehicle control device 220 may include at least one of a steering actuator for steering a driving direction of the driving vehicle and/or an acceleration/deceleration actuator for controlling a driving speed of the driving vehicle.

The autonomous vehicle control apparatus 100 may be implemented in the driving vehicle. In this case, the autonomous vehicle control apparatus 100 may be integrally configured with control units in the driving vehicle or may be implemented as a separate device to be connected with the control units of the driving vehicle by a separate connection interface.

The autonomous vehicle control apparatus 100 may control autonomous driving, and may determine whether to activate an autonomous driving mode or may determine to switch from the autonomous driving mode to a manual driving mode, based on a selection of the vehicle user.

The autonomous vehicle control apparatus 100 may be implemented in the form of an independent hardware device including a memory and a processor for processing each operation or may be driven in the form of being included in another hardware device such as a microprocessor or a universal computer system.

As an example, the autonomous vehicle control apparatus 100 may include a communication device 110, a storage 120, and a processor 130.

The communication device 110 may be a hardware device implemented with various electronic circuits to transmit and receive a signal through a wireless or wired connection, which may transmit and receive information with devices in the driving vehicle based on a network communication technology in the driving vehicle.

As an example, the network communication technology in the driving vehicle may include controller area network (CAN) communication, local interconnect network (LIN) communication, Flex-Ray communication, or the like.

Furthermore, the communication device 110 may perform communication using a server, an infrastructure, another vehicle, or the like outside the driving vehicle via a wireless Internet technology and/or a short-range communication technology.

Herein, the wireless Internet technology may include wireless local area network (WLAN), wireless broadband (WiBro), Wi-Fi, world interoperability for microwave access (WiMAX), or the like. Furthermore, the short-range communication technology may include Bluetooth, ZigBee, ultra wideband (UWB), radio frequency identification (RFID), infrared data association (IrDA), or the like.

As an example, the communication device 110 may perform inter-vehicle communication with at least one of the sensing device 230, the interface device 210, or the vehicle control device 220.

The storage 120 may store a sensing result of the sensing device 230, data obtained by the processor 130, or data, an algorithm, and/or the like necessary for an operation of the processor 130.

For example, the storage 120 may store instructions (e.g., logic, an algorithm, data etc.) for corresponding to a target vehicle (e.g., a surrounding vehicle, a surrounding motorcycle, a surrounding bicycle, or a surrounding mobile body) which abnormally travels while the driving vehicle is autonomously driving.

The storage 120 may include at least one type of a storage medium, such as a flash memory type memory, a hard disk type memory, a micro type memory, a card type memory (e.g., a secure digital (SD) card, an extreme digital (XD) card, etc.), a random access memory (RAM), a static RAM (SRAM), a read-only memory (ROM), a programmable ROM (PROM), an electrically erasable PROM (EEPROM), a magnetic RAM (MRAM), a magnetic disk, or an optical disc.

The processor 130 may be electrically connected with at least one of the communication device 110 or the storage 120 and may electrically control the respective components. The processor 130 may be an electrical circuit which executes instructions of software and may perform a variety of data processing and calculation described below.

The processor 130 may include or more processors, and may be, for example, an electronic control unit (ECU), a micro controller unit (MCU), and/or another sub-controller, which is loaded into the driving vehicle.

The processor 130 may control the overall aspects of autonomous driving, and may determine whether to activate the autonomous driving mode or determine to switch from the autonomous driving mode to the manual driving mode.

The processor 130 may set a drive mode (also referred to as a driving mode) of the driving vehicle to a manual drive mode or an autonomous driving mode (or an automatic drive mode) depending on a user input received from the interface device 210.

As an example, when receiving an autonomous driving request (e.g., an autonomous driving function activation command) from the interface device 210, the processor 130 may switch the drive mode of the driving vehicle from the manual drive mode to the autonomous driving mode.

The processor 130 may recognize a surrounding vehicle (e.g., a nearby vehicle within a threshold distance and/or a vehicle that is located adjacent to the driving vehicle) and a surrounding environment around the driving vehicle using the sensing device 230 and may control driving (or autonomous driving) of the driving vehicle, based on information about the recognized surrounding vehicle and the recognized surrounding environment. A surrounding vehicle (also referred to as a nearby vehicle, a proximate vehicle, a neighboring vehicle, etc.) may refer to any vehicle that is located near (e.g., within a threshold distance) the driving vehicle. A surrounding vehicle may refer to any vehicle that is located adjacent to the driving vehicle (e.g., with no other vehicles in between the driving vehicle and the surrounding vehicle). A surrounding vehicle may be located in front of, behind, and/or next to the driving vehicle. A surrounding vehicle need not surround the driving vehicle from more than one side.

When receiving an autonomous driving release command (or an autonomous driving termination request) during autonomous driving, the processor 130 may switch the drive mode of the driving vehicle from the autonomous driving mode to the manual drive mode.

The processor 130 may monitor one or more surrounding vehicles around the driving vehicle using the sensing device 230. The processor 130 may determine whether there is a target vehicle (e.g., a vehicle of interest) which abnormally travels (e.g., exhibits an abnormal and/or unsafe driving pattern) among the monitored surrounding vehicles.

The processor 130 may select a vehicle that potentially may threaten the safety of the driving vehicle and/or a driving vehicle user as a target vehicle.

The processor 130 may enter a safety mode (e.g., a defensive driving mode) to execute response logic for the target vehicle and may control the driving vehicle. To avoid (e.g., keep the distance at a predetermined minimum distance or more) the selected target vehicle, the processor 130 may execute first avoidance logic (also referred to as primary response logic or first evasive logic) of controlling the driving vehicle to change a driving lane in a driving route (or a lane of the driving route).

The processor 130 may control the driving vehicle to accelerate and/or decelerate or change a driving lane without changing the driving route. By deploying the primary response logic, distance between the driving vehicle and the target vehicle increases via the primary response logic, the driving vehicle may ensure a safe space.

When abnormal driving of the target vehicle continues over a few minutes or several tens of minutes, after executing the primary response logic, the processor 130 may execute second avoidance logic (or secondary response logic) of resetting the driving route to a destination of the driving vehicle. The processor 130 may change the driving route to a second driving route, at least a portion of which is different from the initially set first driving route.

Even while the driving vehicle is traveling along the second driving route, the processor 130 may determine whether abnormal driving pattern of the target vehicle continues. When it is determined that the abnormal driving pattern of the target vehicle continues, the processor 130 may control a navigation device to change the destination of the driving vehicle to a nearby safe location (e.g., a police station, a public parking lot, a town center, etc.).

The autonomous vehicle may be classified (e.g., defined) into Level 0, Level 1, Level 2, Level 3, Level 4, and/or Level 5, as shown in Table 1 below.

TABLE 1

| Level | Feature |
|---|---|
| Level 0 (No Automation) | Hands On Always operated by the driver/assist with the vehicle system in the emergency situation |
| Level 1 (Driver Assistance) | Hands On Allows the vehicle system to assist with steering or deceleration/acceleration |
| Level 2 (Partial Automation) | Hands Off Allows the vehicle system to assist with steering or deceleration/acceleration |

TABLE 1-continued

| Level | Feature |
|---|---|
| Level 3 (Conditional Automation) | Eyes Off Allows a vehicle user (e.g., a driver, a passenger, or a vehicle owner) to intervene in case of danger |
| Level 4 (High Automation) | Mind Off Does not require an intervention by a vehicle user |
| Level 5 (Full Automation) | Driver Off Does not require a vehicle user |

Level 0 may be a no automation level, which may be a mode always operated by a vehicle user (e.g., a driver). Level 1 may be a driver assistance level, which may allow a vehicle system to assist with steering or deceleration/acceleration control.

At this time, the vehicle user is required to hold the steering wheel in a hands-on state in Level 0 and Level 1. Level 2 may be a partial automation level, which may allow the vehicle system to assist with steering and deceleration/acceleration control and may facilitate a hands-off state of the vehicle user.

Level 3 may be a conditional automation level, which may allow the vehicle user to intervene upon a dangerous driving situation. Level 4 may be a high automation level, which is a state where it is unnecessary for the vehicle user to intervene. Level 5 may be a full automation level, which may be a level that does not require a vehicle user.

For the system of the autonomous vehicle of Level 2 or below, the vehicle user should pay attention to a surrounding vehicle and a driving situation. Thus, when there is a target vehicle (e.g., a vehicle of interest, a vehicle exhibiting an unsafe driving pattern, etc.) among the surrounding vehicles around the autonomous vehicle of Level 2 or below, the autonomous vehicle of Level 2 or below may avoid the target vehicle via a change in speed (e.g., acceleration and/or deceleration), a lane change, and/or a change in driving route due to the intervention of the vehicle user.

For the system of the autonomous vehicle of Level 3 or above, the vehicle user may not pay attention to a surrounding situation and driving may be accomplished under determination (e.g., supervision) of the vehicle system.

Thus, when there is a target vehicle (e.g., a vehicle of interest, a vehicle exhibiting an unsafe driving pattern, etc.) among surrounding vehicles around the autonomous vehicle of Level 3 or above, the autonomous vehicle of Level 3 or above may avoid the target vehicle via a change in speed (e.g., acceleration and/or deceleration), a lane change, and/or a change in driving route due to determination of the vehicle system without the intervention of the vehicle user.

Figure 2:
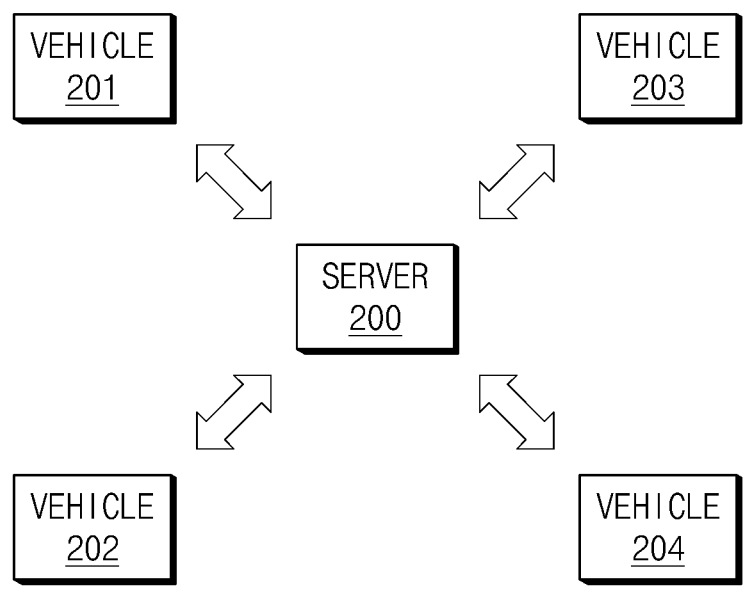
FIG. 2 is a block diagram illustrating a configuration of an example driving system to which an autonomous vehicle control apparatus is applied.
Figure 3:
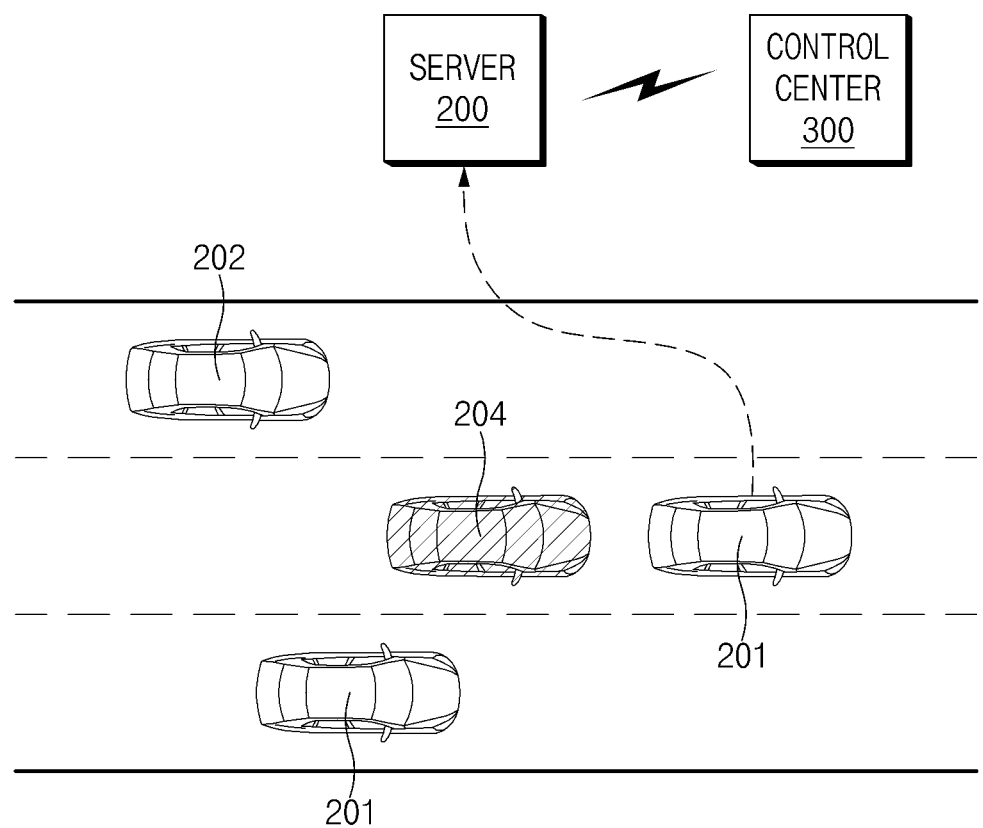
FIG. 3 is an illustration of an example for describing avoidance logic of an autonomous driving system to which an autonomous vehicle control apparatus is applied.

FIG. 2 is a block diagram illustrating a configuration of an autonomous driving system to which an example autonomous vehicle control apparatus is applied. FIG. 3 is an illustration of an example for describing avoidance logic of an autonomous driving system to which an autonomous vehicle control apparatus is applied.

A plurality of vehicles are illustrated as four vehicles in FIGS. 2 and 3, but this is only an example, and there may be fewer or more vehicles than four vehicles.

Referring to FIGS. 2 and 3, at least one of a plurality of vehicles 201 to 204 may include an autonomous vehicle control apparatus 100 of FIG. 1. Each of the at least one vehicles 201 to 204 including the autonomous vehicle control apparatus 100 may communicate with a server 200 over a network.

The server 200 may include a device for managing driving of one or more of the vehicles 201 to 204 in an autonomous driving system. The server 200 may receive data associated with driving from the vehicle 201 to 204, each of which includes the autonomous vehicle control apparatus 100, may process data necessary for driving of the vehicle 201 to 204, and may provide the processed data to the plurality of vehicles 201 to 204, Furthermore, the server 200 may store at least one of data received from the plurality of vehicles 201 to 204, the processed data, or related information in a database, or any combination thereof in the server 200.

As an example, as shown in FIG. 3, a vehicle that exhibits an abnormal driving pattern among the plurality of vehicles 202 to 204 located around the driving vehicle 201 may be selected as the target vehicle 204 by a processor 130 of the driving vehicle 201.

The server 200 may receive at least one of identification information or driving information regarding the target vehicle 204, or any combination thereof from the driving vehicle 201. The server 200 may store and manage at least one of the identification information or the driving information about the target vehicle 204, or any combination thereof in the database and may record the at least one of the identification information or the driving information as an event, or any combination thereof in the database.

When it is determined that there is a probability (e.g., greater than a threshold probability) of causing an accident by the target vehicle 204, the server 200 may deliver at least one of the identification information or the driving information of the target vehicle 204, or any combination thereof to a control center 300.

The control center 300 may be operated by a public institution such as at least one of a local government, the Korea Expressway Corporation (or its equivalent), the Korea Infrastructure Safety and Technology Corporation (or its equivalent), or the National Police Agency (or its equivalent). Because the control center 300 is able to take direct and/or indirect action against the target vehicle 204, it may reduce a risk of occurrence of an accident by the target vehicle 204.

Figure 4:
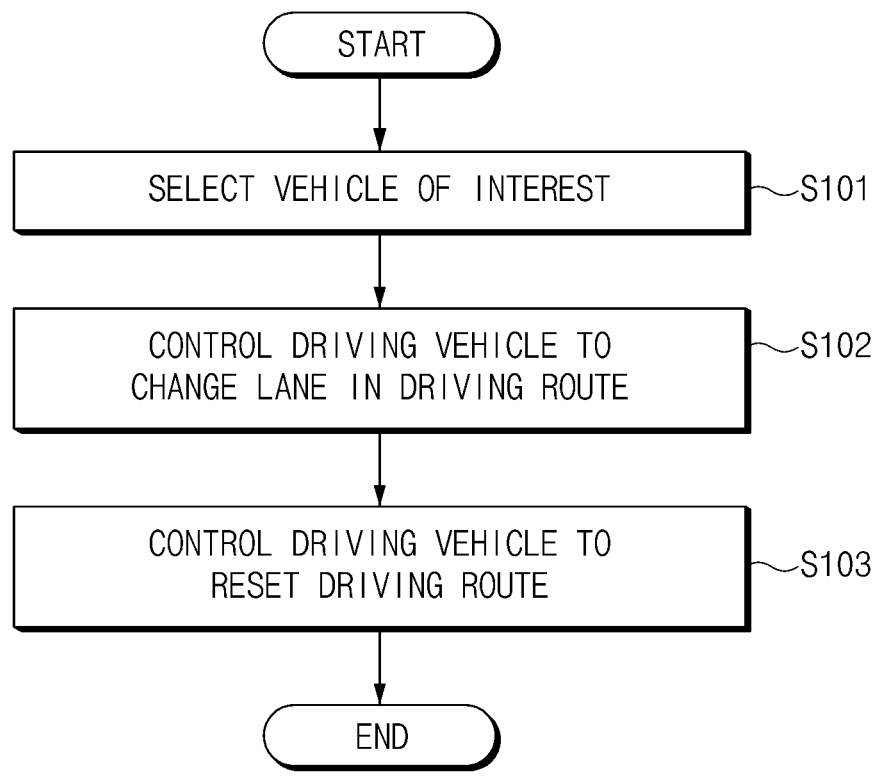
FIG. 4 is a flowchart illustrating an example autonomous vehicle control method.

Hereinafter, a description will be given in brief of an autonomous vehicle control method according to an embodiment of the present disclosure with reference to FIG. 4. FIG. 4 is a flowchart schematically illustrating an example autonomous vehicle control method.

Hereinafter, it is assumed that an autonomous vehicle control apparatus 100 of FIG. 1 performs a process of FIG. 4. Furthermore, in a description of FIG. 4, an operation described as being performed by an autonomous vehicle control apparatus 100 may be understood as being controlled by a processor 130 of the autonomous vehicle control apparatus 100.

In S101, the processor 130 may monitor surrounding vehicles around a vehicle (e.g., a driving vehicle), whose autonomous driving mode has been activated. The driving vehicle may use a sensing device 230 of FIG. 1 and may determine whether there is a target vehicle that exhibits an abnormal driving pattern and/or behavior (e.g., an unusual driving pattern and/or behavior, an unsafe driving pattern and/or behavior, an aggressive driving pattern and/or behavior, a reckless driving pattern and/or behavior, etc.) among the monitored surrounding vehicles. Determination of the abnormal driving pattern may be accomplished by comparing the driving pattern of the target vehicle with other driving patterns known to be abnormal, unusual, unsafe, aggressive, and/or reckless, such as speeding, swerving, drifting out of its driving lane, driving at an excessively low speed, etc. The processor 130 may select a surrounding vehicle (e.g., a nearby vehicle), which may potentially threaten the safety of the driving vehicle and/or a driving vehicle user, as a target vehicle.

In S102, the processor 130 may enter a safety mode (e.g., a defensive driving mode) to execute response logic (e.g., a response algorithm) for the target vehicle and may control the driving vehicle. To avoid (e.g., keep the distance at a predetermined minimum distance or more) the selected target vehicle, the processor 130 may execute first avoidance logic (e.g., primary response logic, primary evasive logic) of controlling the driving vehicle to change a driving lane within a driving route (or a lane of the driving route). By increasing a distance between the driving vehicle and the target vehicle and/or keeping a minimum distance via the execution of the primary response logic, the driving vehicle may ensure a safe space.

Even after executing the primary response logic, if the abnormal driving pattern of the target vehicle persists, in S103, the processor 130 may execute second avoidance logic (e.g., secondary response logic, secondary evasive logic) of resetting a driving route to a destination of the driving vehicle (e.g., switching from a first driving route to a second driving route different from the first driving route). The processor 130 may change the driving route to the destination to a second driving route different from the initially set first driving route.

Even while the driving vehicle is traveling along the second driving route, the abnormal driving pattern of the target vehicle may persist in a position close (e.g., within a threshold distance) to the driving vehicle. In this case, the processor 130 may control a navigation device to change the destination of the driving vehicle to a safe location (e.g., nearby police station, a public parking lot, a town center, etc.).

Figure 5:
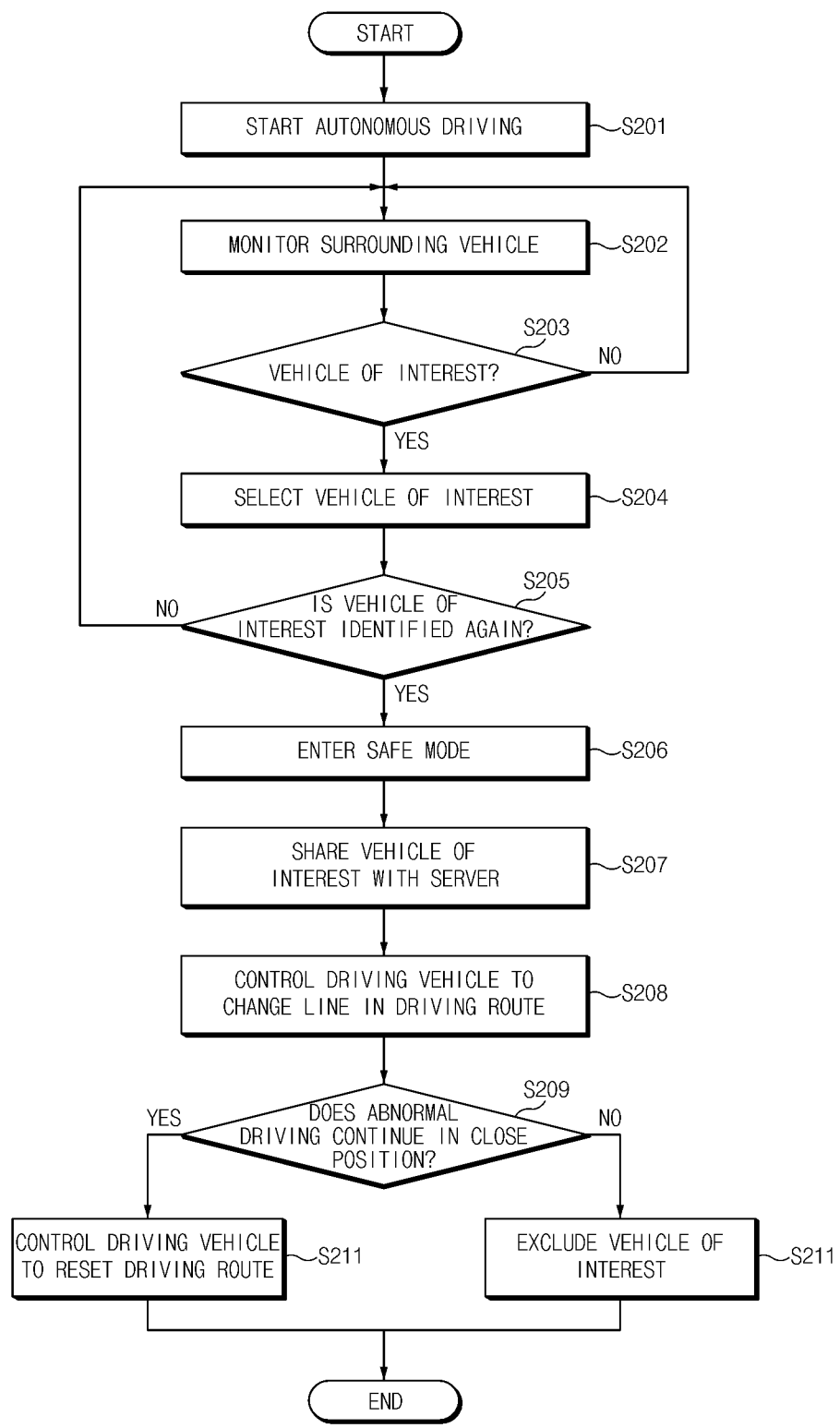
FIG. 5 is a flowchart illustrating further details of an example autonomous vehicle control method.

Hereinafter, a description will be given in detail of an autonomous vehicle control method with reference to FIG. 5. FIG. 5 is a flowchart illustrating further details of an example autonomous vehicle control method.

Hereinafter, it is assumed that an autonomous vehicle control apparatus 100 of FIG. 1 performs a process of FIG. 5. Furthermore, in a description of FIG. 5, an operation described as being performed by an autonomous vehicle control apparatus 100 may be understood as being controlled by a processor 130 of the autonomous vehicle control apparatus 100.

When an autonomous driving request is received, in S201, the processor 130 in the autonomous vehicle control apparatus 100 may perform (e.g., initiate, activate, etc.) autonomous driving of a vehicle. The processor 130 may receive an autonomous driving request signal from an interface device 210 of FIG. 1 based on a manipulation (e.g., a user input) of a vehicle user (e.g., a driver, a passenger, or an owner). When the autonomous driving request is received, the vehicle may initiate autonomous driving.

In S202, the processor 130 of the vehicle (or the driving vehicle), the autonomous driving of which is initiated, may monitor a surrounding situation around the driving vehicle. The processor 130 of the driving vehicle may store image data generated, for example, by a sensing device 230 of FIG. 1 (e.g., a camera) in a storage 120 of FIG. 1 and may monitor at least one of identification information or driving information of one or more surrounding vehicles from the image data.

Herein, the identification information of the surrounding vehicle may include at least one of a vehicle number (e.g., a license plate number), a vehicle make, a vehicle model, a vehicle color, or any combination thereof.

Furthermore, the driving information of a surrounding vehicle may include at least one of a speed of the surrounding vehicle, a position of the surrounding vehicle, a timestamp, an autonomous driving level, lane change related information (e.g., the number of lane changes in a specific section), a distance between vehicles (e.g., a clearance gap upon a lane change), the number of abnormal (e.g., reckless) overtaking, the number of sudden brakes, or any combination thereof.

In S203, the processor 130 of the driving vehicle may determine whether there is at least one target vehicle which exhibits an abnormal driving pattern among the surrounding vehicles. The processor 130 of the driving vehicle may compare a predetermined (e.g., known) abnormal driving pattern with the monitored driving pattern to determine a target vehicle based on the result of the comparison.

As an example, the processor 130 of the driving vehicle may determine a vehicle, which exhibits an abnormal driving pattern (e.g., a unique driving pattern or a threatening driving pattern) as shown in Table 2 below among the one or more surrounding vehicles, as the target vehicle.

The unique (e.g., unusual) driving pattern of a surrounding vehicle may be characterized by one or more conditions including driving on an identical route as the driving vehicle for an extended period of time, a number of times the surrounding vehicle drifts out (e.g., veers out, swerves out, etc.) of a driving lane (e.g., drifts into an adjacent lane), an amount of time driven by the surrounding vehicle while drifting out (e.g., veered out, swerved out, etc.) of the driving lane (e.g., drifted into an adjacent lane), a speed of the surrounding vehicle that is less than the road speed limit, or any combination thereof. For example, the unique driving pattern may include one or more patterns (e.g., at least one of first to third patterns) described in Table 2 below.

TABLE 2

| First Pattern | When the surrounding vehicle's route is the same as the driving vehicle within a threshold distance for more than a threshold time amount |
| --- | --- |
| Second Pattern | When drifting out of a driving lane for a certain period of time |
| Third Pattern | When traveling at a speed below the speed limit for more than a threshold time amount |
| Fourth Pattern | When traveling close behind (e.g., tailgating) the driving vehicle within a threshold distance (e.g., 10 m) |
| Fifth Pattern | When repeatedly (e.g., more often than a threshold amount) performing sudden (e.g., having a rate of deceleration greater than a threshold rate) stops in front of the driving vehicle |
| Sixth Pattern | When frequently (e.g., more often than a threshold amount) making a lane change over a specific amount of time (e.g., lane changes over five times within one minute) |
| Seventh Pattern | When traveling at a higher (e.g., surpassing by more than a threshold amount) speed than the speed limit for more than a threshold time amount (e.g., traveling at least 20 km/h over the road speed limit for more than 5 seconds) |
| Eighth Pattern | When performing rapid (e.g., exceeding a threshold rate) acceleration or rapid deceleration |

The threatening driving pattern may be characterized by one or more conditions including at least one of a distance between the surrounding vehicle and the driving vehicle, a number of sudden (e.g., having a rate of deceleration greater than a threshold rate) stops of the surrounding vehicle in front of the driving vehicle, a number of lane changes of the surrounding vehicle, a speed of the surrounding vehicle that is greater than the road speed limit, a number of instances of rapid (e.g., exceeding a threshold rate) acceleration or rapid deceleration, or any combination thereof. For example, the threatening driving pattern may include at least one of fourth to eighth patterns described in Table 2 above.

The processor 130 of the driving vehicle may consider a condition for at least one of a number of times the surrounding vehicle drifts out (e.g., veers out, swerves out, etc.) of a driving lane (e.g., drifts into an adjacent lane), an amount of time driven by the surrounding vehicle while drifting out of the driving lane, a number of sudden stops of the surrounding vehicle in front of the driving vehicle, a number of lane changes of the surrounding vehicle, a speed of the surrounding vehicle that is greater than the road speed limit, a number of rapid acceleration or rapid deceleration, or any combination thereof.

In other words, when the traffic situation of the driving route is a congestion (e.g., slow or stopped traffic), the processor 130 of the driving vehicle may exclude at least one of the first to eighth patterns as shown in Table 2 from criteria for determining the target vehicle. For example, when the road where the driving vehicle is located is experiencing a traffic congestion, the first pattern, the third pattern, and the fourth pattern may be excluded from the criteria for determining the target vehicle.

In S204, the processor 130 of the driving vehicle may select, among the surrounding vehicles, a surrounding vehicle that meets at least one of the first to eighth patterns as the target vehicle.

The processor 130 of the driving vehicle may notify a user of the driving vehicle of the selected target vehicle using at least one of visual information or audible information. For example, the processor 130 may output at least one of a voice message and/or a text message, "A surrounding vehicle in a specific location has been identified as exhibiting an aggressive driving behavior. Do you want to activate the defensive driving mode?" or "Do you want to switch to manual driving?".

In S205, the user of the driving vehicle may identify driving information of the target vehicle again. When it is determined that the target vehicle's driving pattern is normal based on the result (e.g., user input) identified by the user of the driving vehicle, the processor 130 may exclude the target vehicle from the object of interest and may continue monitoring surrounding vehicles.

When it is determined that the target vehicle's driving pattern is abnormal based on the result identified by the user of the driving vehicle, in S206, the processor 130 may execute response logic associated with the safety mode.

The processor 130 may output a cautionary warning for safety to the user of the driving vehicle through a display using at least one of a voice message and/or a text message. The target vehicle may be selected in response to an input of the user of the driving vehicle to a screen of the display included in an interface device (e.g., an AVN) in the driving vehicle. When a graphic representation of the target vehicle is displayed on the screen of the display, it may be determined by the selection of the user of the driving vehicle. Furthermore, the user of the driving vehicle may select an application capable of executing at least one of first avoidance logic of controlling the driving vehicle to change a driving lane in the driving route (or a lane of the driving route) and/or second avoidance logic of controlling the driving vehicle to reset the driving route to a driving route, at least a portion of which is different from the initially set driving route, on the screen of the display.

Furthermore, in S207, the processor 130 may share information of the selected target vehicle with a server 200 of FIG. 2 or 3. The processor 130 may transmit at least one of identification information and/or driving information about the selected target vehicle to the server 200. The server 200 may store and/or manage at least one of the identification information, the driving information about the target vehicle, or any combination thereof in its database and may record the at least one of the identification information, the driving information as an event, or any combination thereof in the database.

In S208, the processor 130 may execute the first avoidance logic of controlling the driving vehicle to change a driving lane in the driving route (or a driving lane of the driving route). The processor 130 may control the driving vehicle to avoid the target vehicle on a first driving route without correcting the driving route of the driving vehicle.

The first driving route may be an original route set based on at least one of a road traffic situation to the destination of the driving vehicle or a congestion situation of the driving vehicle, or any combination thereof.

The processor 130 may control the driving vehicle to accelerate and/or decelerate or change a driving lane to control the driving vehicle to ensure a safe space from the target vehicle.

As an example, for the first pattern, the fourth pattern, and the fifth pattern directly affecting the safety of the driving vehicle, the processor 130 may control a vehicle control device 220 of FIG. 1 to change a driving lane of the driving vehicle. As another example, when it is difficult to change a driving lane of the driving vehicle (e.g., not satisfying the criteria for safely changing the driving lane), the processor 130 may control the vehicle control device 220 to change a speed of the driving vehicle.

In S209, the processor 130 may determine whether abnormal driving of the target vehicle continues and proximity of the target vehicle.

When it is determined that the target vehicle is not close to the driving vehicle or that the abnormal driving of the target vehicle does not continue, in S210, the processor 130 may exclude the target vehicle from the object of interest.

When it is determined that the target vehicle is close to the driving vehicle or the abnormal driving of the target vehicle continues, the processor 130 may execute the second avoidance logic of changing and resetting the initially set driving route.

The processor 130 may change the driving route to the destination to a second driving route, at least a portion of which is different from the initially set first driving route. For example, the second driving route may be a route where it is possible to change a driving distance to less than "q (where q is an integer which is the same as or different from p)" km, when the destination arrival time is less than "p (where p is a positive integer)" minutes. The second driving route may become longer or shorter in the driving time to the destination than the initially set first driving route.

Even after changing the driving route, the processor 130 may determine whether the abnormal driving of the target vehicle continues. For example, after being changed to the second driving route where the driving route of the driving vehicle is reset, the processor 130 may determine whether the abnormal driving of the target vehicle continues over a few minutes or several tens of minutes in a position close to the driving vehicle.

When it is determined that the abnormal driving of the target vehicle continues, the processor 130 may control a navigation device to change the destination of the driving vehicle to safe location (e.g., a nearby police station).

When the processor 130 operates with the second avoidance logic of changing and resetting the initially set driving route, the server 200 may determine that there is a probability (e.g., a probability exceeding a threshold value) of an accident being caused by the target vehicle. The server 200 may deliver at least one of identification information of the target vehicle, which is determined that there is the probability of causing the accident, driving information of the target vehicle, identification information of the driving vehicle, the second driving route of the driving vehicle, or any combination thereof to a control center 300 of FIG. 3. Because the control center 300 is able to take direct and/or indirect action against the target vehicle, it may reduce a risk of occurrence of an accident caused by the target vehicle FIG. 6 is a block diagram illustrating a computing system for executing an example autonomous vehicle control method.

Figure 6:
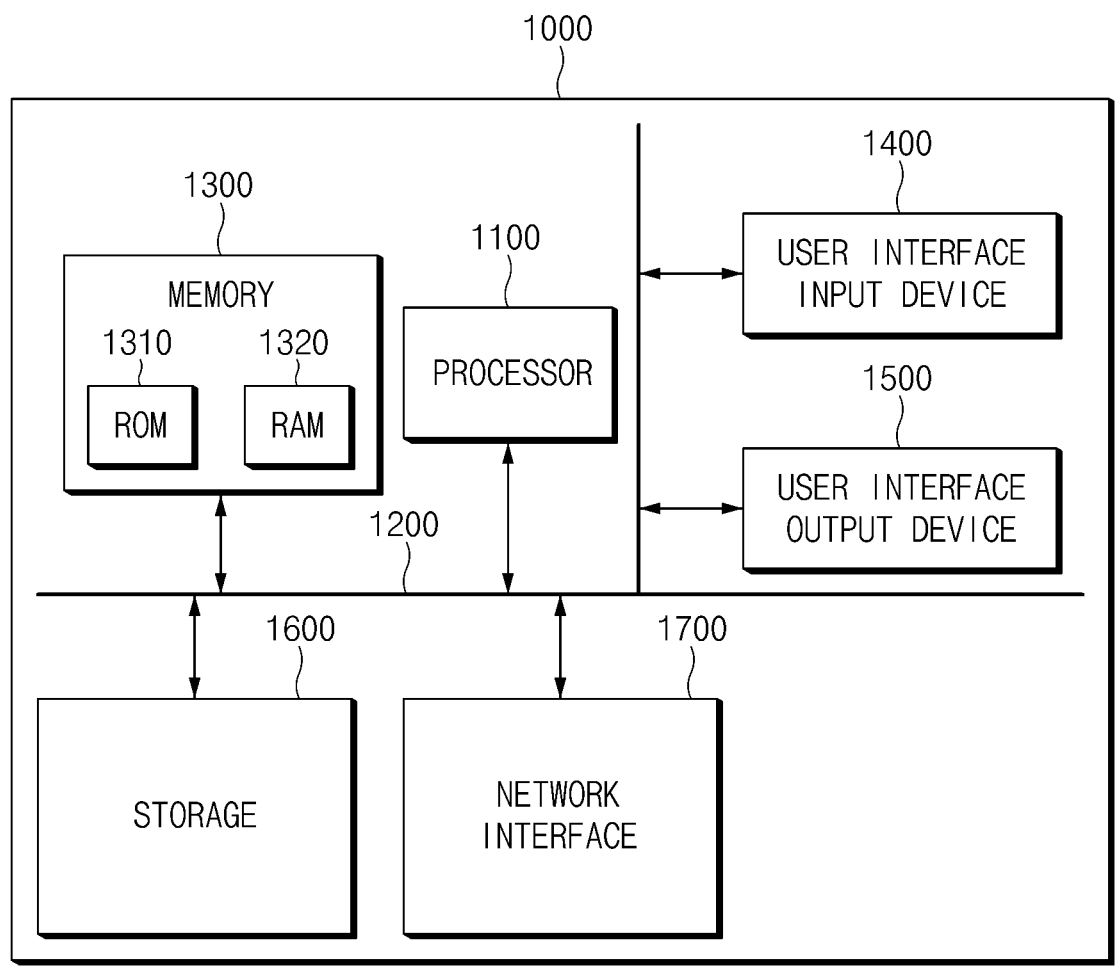
FIG. 6 is a block diagram illustrating a computing system for executing an example autonomous vehicle control method.

Referring to FIG. 6, the autonomous vehicle control method may be implemented by a computing system 1000. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM 1310 and a RAM 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disk, a removable disk, and a compact disc read-only memory (CD-ROM).

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may select a target vehicle which travels with unique driving or threatening driving among surrounding vehicles using a sensing device mounted on an autonomous vehicle, without separate equipment.

Furthermore, the present technology may execute avoidance logic for the target vehicle which travels with the unique driving or the threatening driving, thus preventing an accident which may occur due to the target vehicle.

Furthermore, the present technology may detect a target vehicle and may derive appropriate countermeasures in the autonomous vehicle control apparatus itself, even in a situation that it is difficult for a vehicle passenger to recognize, thus safely protecting the vehicle and the vehicle passenger from a dangerous situation.

In addition, the present technology may be applied to all vehicles (e.g., autonomous driving-based robo-taxi) capable of performing autonomous driving as well as a private vehicle.

In addition, various effects ascertained directly or indirectly through the present disclosure may be provided.

According to an aspect of the present disclosure, an autonomous vehicle control apparatus may include a processor that controls autonomous driving of a driving vehicle and a storage storing data and an algorithm run by the processor. The processor may monitor a plurality of surrounding vehicles located around the driving vehicle, may select a target vehicle among the plurality of surrounding vehicles, may control the driving vehicle to avoid the target vehicle while maintaining a first driving route of the driving vehicle, and may control the driving vehicle to reset a driving route of the driving vehicle to a second driving route different from the first driving route, depending on whether abnormal driving of the target vehicle continues.

In an embodiment, the processor may compare a monitored driving pattern with a predetermined abnormal driving pattern and may select the target vehicle among the plurality of surrounding vehicles.

In an embodiment, the abnormal driving pattern may include at least one of a unique driving pattern or a threat driving pattern, or any combination thereof.

In an embodiment, the unique driving pattern may include a condition for at least one of driving route consistency between the surrounding vehicle and the driving vehicle, the number of times the surrounding vehicle invades a driving line and a driving time when the surrounding vehicle invades the driving line, or a speed of the surrounding vehicle, the speed being less than a road speed limit, or any combination thereof.

In an embodiment, the threat driving pattern may include a condition for at least one of a headway distance between the surrounding vehicle and the driving vehicle, the number of sudden stops of the surrounding vehicle in front of the driving vehicle, the number of lane changes of the surrounding vehicle, a speed of the surrounding vehicle, the speed being greater than a road speed limit, or the number of rapid acceleration or rapid deceleration, or any combination thereof.

In an embodiment, the processor may select the target vehicle among the plurality of surrounding vehicles depending on the volume of traffic on the driving route.

In an embodiment, the processor may select the target vehicle depending on a condition for at least one of the number of times the surrounding vehicle invades a driving line and a driving time when the surrounding vehicle invades the driving line, the number of sudden stops of the surrounding vehicle in front of the driving vehicle, the number of lane changes of the surrounding vehicle, a speed of the surrounding vehicle, the speed being greater than a road speed limit, or the number of rapid acceleration or rapid deceleration, or any combination thereof, when a traffic situation of the driving route is a congestion or slow situation.

In an embodiment, the processor may control the driving vehicle to change a driving line in the first driving route, when the abnormal driving pattern of the target vehicle is directly associated with the driving vehicle.

In an embodiment, the processor may control the driving vehicle to accelerate or decelerate in the first driving route, when it is difficult to change a driving line of the driving vehicle.

In an embodiment, the processor may set a destination of the driving vehicle to a safe place, when the abnormal driving of the target vehicle continues, after being reset to the second driving route.

In an embodiment, the processor may be configured to store at least one of identification information of the target vehicle or driving information of the target vehicle, or any combination thereof in a database of a server.

In an embodiment, the target vehicle may be selected by means of an interface device in the driving vehicle, in response to an input of a user of the driving vehicle. The processor may control the driving vehicle to avoid the target vehicle selected by the input of the user of the driving vehicle while maintaining the first driving route and may control the driving vehicle to travel along the second driving route, depending on whether abnormal driving of the target vehicle selected by the input of the user continues.

In an embodiment, the target vehicle may be determined by a selection of a user of the driving vehicle, when the target vehicle is displayed on an interface device in the driving vehicle. The processor may control the driving vehicle to avoid the target vehicle determined by the selection of the user of the driving vehicle while maintaining the first driving route and may control the driving vehicle to travel along the second driving route, depending on whether abnormal driving of the target vehicle determined by the selection of the user continues.

In an embodiment, at least one of identification information of the target vehicle, identification information of the driving vehicle, or the second driving route, or any combination thereof may be delivered to a control center, after being reset to the second driving route.

According to another aspect of the present disclosure, an autonomous vehicle control method may include monitoring a plurality of surrounding vehicles located around a driving vehicle, selecting a target vehicle among the plurality of surrounding vehicles, controlling the driving vehicle to avoid the target vehicle while maintaining a first driving route of the driving vehicle, and controlling the driving vehicle to reset a driving route of the driving vehicle to a second driving route different from the first driving route, depending on whether abnormal driving of the target vehicle continues.

In an embodiment, the controlling of the driving vehicle to avoid the target vehicle while maintaining the first driving route of the driving vehicle may include controlling the driving vehicle to change a driving line in the first driving route, when an abnormal driving pattern of the target vehicle is directly associated with the driving vehicle, or accelerating or decelerating the driving vehicle in the first driving route, when it is difficult to change a driving line of the driving vehicle.

In an embodiment, the autonomous vehicle control method may further include setting a destination of the driving vehicle to a safe place, when the abnormal driving of the target vehicle continues, after being reset to the second driving route.

In an embodiment, the target vehicle may be selected by means of an interface device in the driving vehicle, in response to an input of a user of the driving vehicle. The driving vehicle may be controlled to avoid the target vehicle selected by the input of the user of the driving vehicle while maintaining the first driving route and may be controlled to travel along the second driving route, depending on whether abnormal driving of the target vehicle selected by the input of the user continues.

In an embodiment, the target vehicle may be determined by a selection of a user of the driving vehicle, when the target vehicle is displayed on an interface device in the driving vehicle. The driving vehicle may be controlled to avoid the target vehicle determined by the selection of the user of the driving vehicle while maintaining the first driving route and may be controlled to travel along the second driving route, depending on whether abnormal driving of the target vehicle determined by the selection of the user continues.

In an embodiment, the autonomous vehicle control method may further include delivering at least one of identification information of the target vehicle, identification information of the driving vehicle, or the second driving route, or any combination thereof to a control center, after being reset to the second driving route.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An autonomous vehicle control apparatus comprising:
   one or more processors configured to control autonomous driving of a driving vehicle; and
   memory storing instructions that, when executed by the one or more processors, cause the autonomous vehicle control apparatus to:
   monitor one or more surrounding vehicles located around the driving vehicle;
   select a target vehicle among the one or more surrounding vehicles;
   control the driving vehicle to ensure a safe space from the target vehicle, by ensuring a distance greater than a threshold distance between the driving vehicle and the target vehicle, while maintaining a first driving route of the driving vehicle; and
   control the driving vehicle to change to a second driving route different from the first driving route, based on the target vehicle exhibiting an abnormal driving pattern,
   wherein the autonomous vehicle control apparatus is configured to determine whether the abnormal driving pattern of the target vehicle continues after changing to the second driving route from the first driving route,
   wherein a graphic representation of the target vehicle is displayed on a user interface of the driving vehicle, wherein a driving distance via the second driving route is less than a first threshold, and wherein a time difference between a first driving time to a destination via the second driving route and a second driving time to the destination via the first driving route is greater than a second threshold.

2. The autonomous vehicle control apparatus of claim 1, wherein the instructions, when executed by the one or more processors, cause the autonomous vehicle control apparatus to select the target vehicle by:
   comparing a monitored driving pattern of the target vehicle with the abnormal driving pattern; and
   selecting, based on the comparison, the target vehicle among the one or more surrounding vehicles.

3. The autonomous vehicle control apparatus of claim 1, wherein the abnormal driving pattern comprises at least one of a unique driving pattern or a threatening driving pattern.

4. The autonomous vehicle control apparatus of claim 3, wherein the unique driving pattern comprises at least one of:
   the target vehicle and the driving vehicle driving in a same driving lane,
   a number of times the target vehicle drifts out of a driving lane,
   an amount of time driven by the target vehicle while drifting out of the driving lane, or
   a speed of the target vehicle being less than a road speed limit.

5. The autonomous vehicle control apparatus of claim 3, wherein the threatening driving pattern comprises at least one of:
   a distance between the target vehicle and the driving vehicle,
   a number of sudden stops made by the target vehicle in front of the driving vehicle,
   a number of lane changes made by the target vehicle,
   a speed of the target vehicle being greater than a road speed limit, or
   a number of instances of rapid acceleration or rapid deceleration.

6. The autonomous vehicle control apparatus of claim 1, wherein the instructions, when executed by the one or more processors, cause the autonomous vehicle control apparatus to select the target vehicle among the one or more surrounding vehicles based on a volume of traffic on the first driving route.

7. The autonomous vehicle control apparatus of claim 1, wherein the instructions, when executed by the one or more processors, cause the autonomous vehicle control apparatus to select the target vehicle based on at least one of:
   a number of times the target vehicle drifts out of a driving lane,
   an amount of time driven by the target vehicle while drifting out of the driving lane,
   a number of sudden stops made by the target vehicle in front of the driving vehicle,
   a number of lane changes made by the target vehicle,
   a speed of the target vehicle being greater than a road speed limit,
   a number of instances of rapid acceleration or rapid deceleration, or
   whether a traffic condition of the first driving route being congested.

8. The autonomous vehicle control apparatus of claim 1, wherein the instructions, when executed by the one or more processors, cause the autonomous vehicle control apparatus to control the driving vehicle to change a driving lane in the first driving route, in response to the abnormal driving pattern of the target vehicle affecting the driving vehicle.

9. The autonomous vehicle control apparatus of claim 1, wherein the instructions, when executed by the one or more processors, cause the autonomous vehicle control apparatus to control the driving vehicle to avoid the target vehicle by controlling the driving vehicle to accelerate or decelerate in the first driving route, based on a determination that it is difficult to change a driving lane of the driving vehicle.

10. The autonomous vehicle control apparatus of claim 1, wherein the instructions, when executed by the one or more processors, further cause the autonomous vehicle control apparatus to set a destination of the driving vehicle to a safe location, based on the abnormal driving pattern of the target vehicle continuing after the driving vehicle switches to the second driving route.

11. The autonomous vehicle control apparatus of claim 1, wherein the instructions, when executed by the one or more processors, cause the autonomous vehicle control apparatus to:
store, in a database of a server, at least one of identification information of the target vehicle or driving information of the target vehicle.

12. The autonomous vehicle control apparatus of claim 1, wherein the instructions, when executed by the one or more processors, cause the autonomous vehicle control apparatus to select the target vehicle by:
receiving, via the user interface of the driving vehicle, a user input selecting the target vehicle.

13. The autonomous vehicle control apparatus of claim 1, wherein the instructions, when executed by the one or more processors, further cause the autonomous vehicle control apparatus to send, to a server and after the driving vehicle switches to the second driving route, at least one of:
identification information of the target vehicle,
identification information of the driving vehicle, or
the second driving route.

14. A method comprising:
monitoring, by one or more processors, one or more surrounding vehicles located around a driving vehicle;
selecting a target vehicle among the one or more surrounding vehicles;
controlling the driving vehicle to ensure a safe space from the target vehicle, by ensuring a distance greater than a threshold distance between the driving vehicle and the target vehicle, while maintaining a first driving route of the driving vehicle;
controlling the driving vehicle to change to a second driving route different from the first driving route, based on the target vehicle exhibiting an abnormal driving pattern; and
determining whether the abnormal driving pattern of the target vehicle continues after changing to the second driving route from the first driving route,
wherein a graphic representation of the target vehicle is displayed on a user interface of the driving vehicle, wherein a driving distance via the second driving route is less than a first threshold, and wherein a time difference between a first driving time to a destination via the second driving route and a second driving time to the destination via the first driving route is greater than a second threshold.

15. The method of claim 14, wherein the controlling of the driving vehicle to ensure the safe space from the target vehicle while maintaining the first driving route of the driving vehicle comprises at least one of:
controlling the driving vehicle to change a driving lane in the first driving route, in response to the abnormal driving pattern of the target vehicle affecting the driving vehicle; or
controlling the driving vehicle to accelerate or decelerate in the first driving route, based on a determination that it is difficult to change the driving lane of the driving vehicle.

16. The method of claim 14, further comprising:
setting a destination of the driving vehicle to a safe location, based on the abnormal driving pattern of the target vehicle continuing after the driving vehicle switches to the second driving route,
wherein the controlling of the driving vehicle to change to the second driving route is based on the target vehicle exhibiting the abnormal driving pattern after ensuring the safe space from the target vehicle.

17. The method of claim 14, wherein the selecting of the target vehicle comprises receiving, via the user interface of the driving vehicle, a user input selecting the target vehicle.

18. The method of claim 14, further comprising:
delivering, by the one or more processors, at least one of identification information of the target vehicle, identification information of the driving vehicle, or the second driving route, or any combination thereof to a control center, after being reset to the second driving route.

* * * * *